Dec. 18, 1962 PAUL-GERHARD KLAR 3,068,933
PACKAGE SEALING MACHINE
Filed Oct. 25, 1960 4 Sheets-Sheet 1

Dec. 18, 1962 PAUL-GERHARD KLAR 3,068,933
PACKAGE SEALING MACHINE
Filed Oct. 25, 1960 4 Sheets-Sheet 2

Dec. 18, 1962 PAUL-GERHARD KLAR 3,068,933
PACKAGE SEALING MACHINE
Filed Oct. 25, 1960 4 Sheets-Sheet 4

United States Patent Office 3,068,933
Patented Dec. 18, 1962

3,068,933
PACKAGE SEALING MACHINE
Paul-Gerhard Klar, Kressbronn am Bodensee, Germany
Filed Oct. 25, 1960, Ser. No. 64,872
Claims priority, application Germany Oct. 29, 1959
8 Claims. (Cl. 156—367)

My invention relates to heat-sealing machines for packages, particularly flat bags, wherein the packages pass between two nipping rollers which apply heat and pressure along one or more edges of the package to effect sealing. The rollers have recesses and raised portions for receiving the packages in the recesses as the package travel through the nipping area with their edges to be sealed located between the raised roller portions. In known packaging machines of this type, the rollers are pressed toward each other by springs whose force is adjustable to permit adapting sealing pressure to the particular package or heat-sealable material being processed.

Some packaging machines of this type have cutting blades mounted on the nipping rollers. As a rule, a relatively high pressure is needed for the cutting operation. In many cases this pressure is too high for the sealing operation proper and hence cannot be maintained during the entire package-producing machine cycle. Therefore, accurately machined cam discs have been used to brace the two nipping rollers relative to each other in such a manner that the high-spring pressure can act only within the immediate cutting range. Such machines are sensitive with respect to the applicable thickness of the packages or bag materials to be used. Furthermore, these machines do not afford a satisfactory control of the actually occurring pressure because this pressure comes about exclusively by the given gap between the nipping rollers and the elastic forces of the package material.

The machines operating with a cam-controlled change in pressure further fail to take into account that the pressure between the roller surfaces, for a given uniform external force imposed upon the rollers, differs during the operation in dependence upon the length of the particular seam being welded. For example, when producing two longitudinal-edge seams each of 5 mm. length, the force is distributed upon a total of 10 mm., whereas at another time point of the same operation, when a transverse seam of 50 mm. length is being made, the same force must be distributed over a total of 60 mm. which corresponds to a hot-sealing pressure of the rollers amounting to ⅙ of the first mentioned value.

It is an object of my invention to provide a package sealing machine, generally of the above-mentioned roller type, with control means capable of regulating the nipping pressure during the sealing operation so as to automatically adapt it to the varying pressure requirements best suited for satisfactory products.

To this end, and in accordance with a feature of my invention, I provide the machine with a programming device which is connected with the roller drive of the machine to operate periodically in a given relation to the package sealing operation, and which is in controlling connection with pressure means acting upon the rollers, so as to periodically vary the sealing pressure in accordance with the given program.

The control of the pressure means by the programming device is effected by a mechanical, hydraulic, pneumatic or electrical transmission means or by a combination thereof. Various control principles are applicable for transferring the operation of the programming device to the variable pressure imposed upon the rollers. For examle, the rollers may be subjected to constant pretensioning corresponding to the force required for producing the longitudinal seams of the packages being produced, whereas all other required forces, being greater than those applied during longitudinal sealing, are applied to the rollers under control by the periodic action of the programming device. If desired, however, the maximum force required during sealing operation may be continuously applied to the rollers as a constant force, and the programming device may then act periodically to reduce the resulting force in accordance with the varying requirements of the processing cycle.

The control and regulation of the nipping pressure in a machine according to the invention involves essentially a variation in forces rather than an appreciable displacement motion. For this reason it is preferable, according to another feature of my invention, to employ an electromagnet for producing or controlling the change in sealing pressure by pulling or pushing action. According to another feature, an electromagnet, electrically controlled from a programming device, is combined with a hydraulic system for transmitting the controlled pressure to the nipping rollers. In this case, the electric current applied to the magnet is preferably controlled by a rotary drum contactor or cam contactor which is connected by a suitable transmission or gearing with the roller drive of the machine to operate in the desired synchronism therewith.

In lieu of using such a rotary contactor, the pressure may also be controlled or released by the travel of the package material itself. This is of advantage for example in cases where the packaging machine is provided with a photoelectric register regulator, in which case, for example, the nipping pressure between the rollers can be reduced to such a small value that slippage between the rollers and the package material, or a complete slipping of the material between the rollers can be obtained.

The control electro-hydraulic system can be given a hydraulic return-flow line so that in idle condition of the machine the hydraulic medium can always flow into and out of the hydraulic system. Then the hydraulic pressure pistons can be kept in any desired position, and the building-up of the nipping pressure can be started from the selected piston position. On the other hand, mechanical transmission members may be employed to have the hydraulic pressure-producing devices always operate in the same range of roller displacement.

The invention will be further understood from the following description of the embodiments of package sealing machines according to the invention illustrated by way of example on the accompanying drawings in which.

The same reference numerals are used in the various illustrations to denote similar elements.

Figure 1:
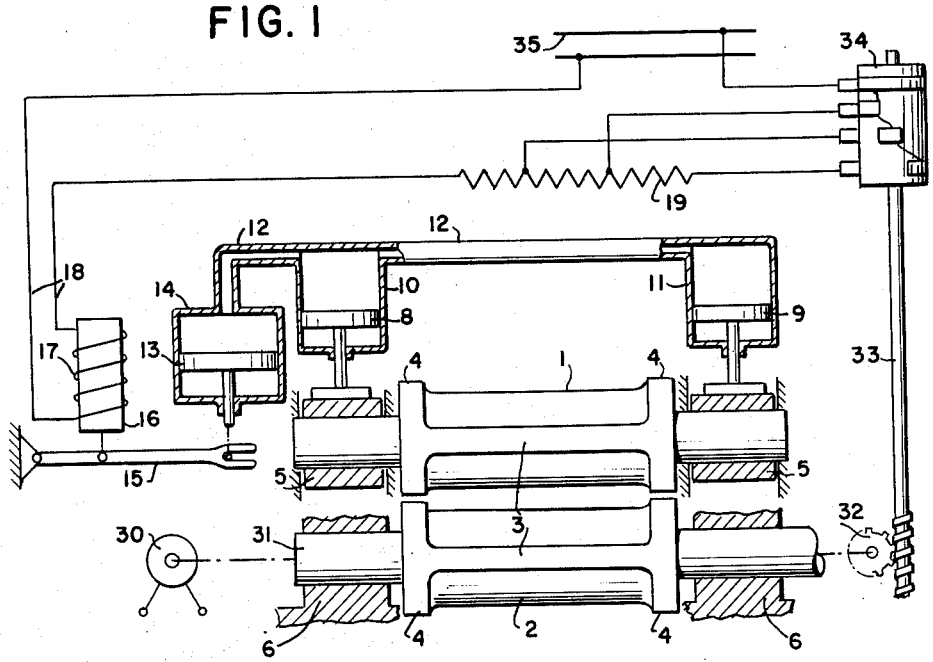
FIG. 1 shows the package-sealing portion of a packaging machine with a programmed control system of the electric-hydraulic type.

The two heated rollers 1, 2 of the machine are provided with recesses so as to form raised transverse portions 3 for sealing the transverse edges of the bag or flat packages passing between the rollers, as well as peripheral raised portions 4 which serve to seal the longitudinal edges. The two bearings 5 of the upper roller 1 are guided in the machine frame structure so as to be displaceable toward and away from the roller 2. The two bearings 6 of the lower roller 2 are fixedly mounted on the frame structure. The bearings 5 are connected with hydraulic pistons 8 and 9 which are displaceable in respective hydraulic cylinders 10 and 11 in order to impose a controlled pressure upon the bearings 5 and thus upon the roller 1. The cylinders 10 and 11 are connected by a hydraulic line 12 with a common pressure source consisting of a hydraulic cylinder 14 with a displaceable piston 13. The piston 13 is linked by a lever 15 with the magnetizable core 16 of a solenoid 17 energized by electric leads 18 from a current source such as a utility line 35. A control rheostat 19 is series-connected in the control circuit and has a number of taps, of which only a few are illustrated. The taps permit controlling the amount of current supplied to the solenoid 17 and thus the amount of force imposed upon the piston 13 of the pressure source, thus correspondingly controlling the pressure equally imposed upon the pistons 8, 9 and hence upon the roller 1.

The shaft 31 of roller 2 is driven through a suitable transmission from an electric motor schematically shown at 30. Also connected with the drive or with the shaft 31 is a gear 32 which drives the shaft 33 of an electric drum contactor 34. The contact segments of this contactor are arranged and shaped in accordance with the desired control program and sequentially connect the proper tapped-off portions of rheostat 19 into the energizing circuit of the solenoid 17 for producing the above-described changes in nipping pressure. As a result, the amount of resistance active in the energizing circuit is dependent upon the cyclical packaging operation of the machine so that at any stage of this operation the proper nipping pressure between the two rollers is controlled by the solenoid 17 and is transmitted by the hydraulic system upon the roller 1.

This control can be made additionally responsive to other control signals extraneous to the packaging operation proper of the machine. In this manner, for example, a photoelectric register regulator, used for controlling the travelling motion of the web of packaging material passing between the nipping rollers, can be used for imposing an additional regulation or pressure correction upon the control system. Such an extraneous signal can be made effective upon the solenoid 17 by connecting another resistor in series with the resistor 19 and impressing upon this additional resistor a variable voltage which acts additively or subtractively to the solenoid voltage from source 35, in dependence upon the signals issued by the photoelectric register regulator. In the same manner, manually operable switches may be connected with the taps of resistor 19 or with the taps of an additional series-connected resistor in order to adjust at will the pressure level from which the automatic regulation by means of the programming device is effected.

A combined electric-hydraulic control system as described above has the further advantage of lending itself readily to applying any desired control program or changing the control program. For example, if the welded seams show locally inferior spots, the program can readily be modified to apply somewhat more pressure at these particular spots or to vary the pressure ratio of longitudinal-seam to transverse-seam, or to proportionally change the entire pressure range of the packaging operation when a different package or package material is to be used.

The use of electromagnetically operating control devices is also of advantage in cases where, due to the particular construction of the machine at the journalling locations of the nipping rollers, a uniform sealing pressure upon the package to be sealed can be secured only by the application of respectively different forces at the two bearings of a roller. However, in most cases where such different forces must be imposed upon the two bearings of a roller, these two forces remain proportional to each other. Hence, the two pressures can be controlled by means of a single electromagnet and a single hydraulic system, the difference in pressure being obtained simply by giving the pressure pistons of the hydraulic system respectively different active areas in accordance with the desired ratio of pressures at the two bearings.

Figure 2:
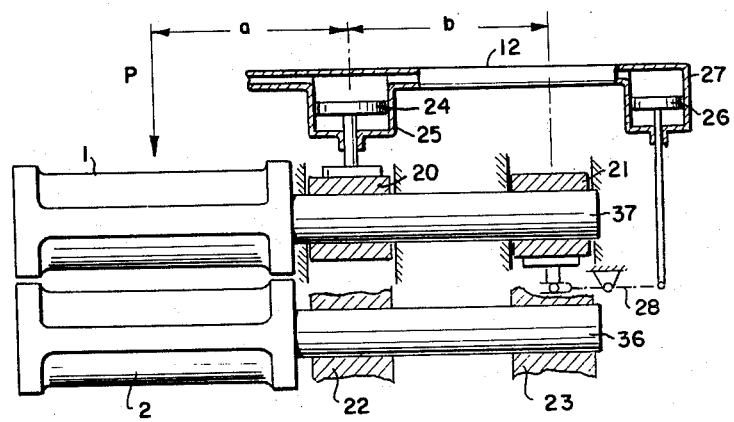
FIG. 2 shows a modified portion of such a machine.

An embodiment of such a machine will be described presently with reference to FIG. 2, showing a modified hydraulic portion in a package sealing machine otherwise corresponding to FIG. 1.

According to FIG. 2, the rollers 1 and 2 are journalled at only one side thereof. The shaft 36 of roller 2 is journalled in two fixed bearings 22, 23. The shaft 37 of roller 1 is journalled in two bearings 20, 21, which are displaceable relative to the frame structure of the machine. The bearing 20 can be pressure loaded by means of a piston 24 in a cylinder 25 of the hydraulic pressure system. The bearing 21 can be loaded by a piston 26 in another cylinder 27 of the hydraulic system, a transmission lever 28 being provided for transmitting the force from piston 26 to the bearing 21. The two cylinders 25, 26 are connected hydraulically to a single source of pressure whose operation is controlled in the same manner and by the same means as shown in FIG. 1.

Depending upon the distances $a$ and $b$ of the bearing centers from the action line of the pressure force P and hence in accordance with the resulting distribution of forces, a uniform action of the hydraulically controlled pressure over the entire working area of the rollers is achieved by giving the hydraulic pistons 24, 26 respectively different areas. The same difference in force can be obtained by using two pistons of the same area but providing between one of them and the appertaining bearing a mechanical transmission of the necessary transmission ratio. That is, the transmission lever 28 in FIG. 2 may also be drawn upon for obtaining the desired pressure differential, by giving the lever a corresponding leverage ratio. The pressure ratio between the nipping rollers remains constant over the entire working range of the machine due to the fact that the hydraulic pressure and the pressure imposed by each piston upon the displaceable bearing 20 or 21 are proportional.

Figure 3:
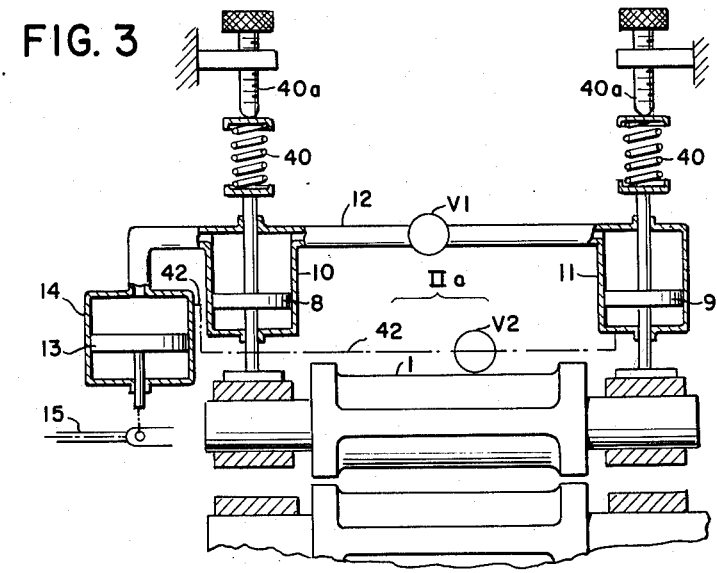
FIG. 3 illustrates a third embodiment.

The embodiment illustrated in FIG. 3 is similar to that shown in FIG. 1, except that the hydraulic pressure-producing means are aided by springs 40 which act between the rods of respective pistons 8, 9 and adjustable fixed abutments constituted by respective set screws 40a in threaded engagement with rigid portions of the machine frame structure. The springs 40 thus subject the top roller 1 to a constant pretensioning force $P_F$, as typified by the force-time diagram in FIG. 4, whereas the peak force required during the sealing operation is hydraulically produced and corresponds to the pressure $P_H$ in FIG. 4, this pressure being variable during the sealing operation under control by the programming means described with reference to FIG. 1.

In the foregoing description of FIG. 3 it is assumed that a valve shown at V1 in hydraulic pressure line 12 is open and that another line schematically indicated at 42 has its valve V2 closed and hence remains inactive. That is, if the above-described performance (FIG. 4) is desired, the line 42, V2 as well as the valve V1 may be omitted. However, the performance can be modified by closing the valve V1 (or omitting the line 12) and instead connecting the cylinders 10, 11 by line 42 with the pressure generating cylinder 14. That is, when the machine is equipped with both pressure lines 12 and 42, the valve V1 may be closed and the valve V2 opened. Under these conditions, the force of springs 40 act as peak force $P_F$ according to the force-time diagram of FIG. 5, whereas the hydraulic force $P'_H$ acts in opposition to the spring force under control by the programming means already described.

Figure 4:
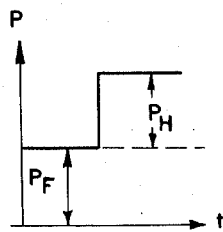
FIGS. 4 and 5 are pressure-time graphs explanatory of its operation.
Figure 5:
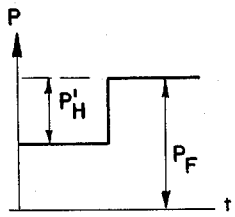
Figure 6:
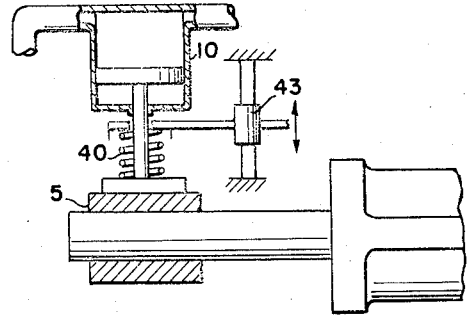
FIGS. 6 and 7 show two further modifications.

The machine illustrated in FIG. 6 is likewise equipped with additional pressure springs 40. In this case, however, the springs 40 are inserted between the respective pressure cylinders and the roller bearings 5, and the spring force can be adjusted by means of a tensioning device 43. This has the advantage that one side of the cylinder 10 (or 11) may remain closed. The performance of the machine is the same as represented in FIG. 4 with reference to the machine of FIG. 3.

Figure 8:
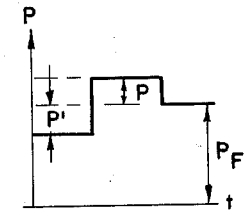
FIG. 8 is a pressure-time graph relating to FIG. 7.
Figure 7:
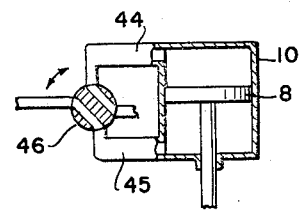

According to FIG. 7, the pressure cylinder 10 is provided with two ducts 44, 45 which are connected to the pressure source by a reversing valve 46 so that by actuation of this valve a variation of the roller pressure is obtainable in accordance with the pressure-time diagram of FIG. 8. In this case, the force of the spring 40, arranged in accordance with FIG. 3 or FIG. 6, constitutes the average force $P_F$, whereas the hydraulic system produces additive pressure P or subtractive pressure P' to produce the necessary resultant pressure maximum or minimum.

Figure 9:
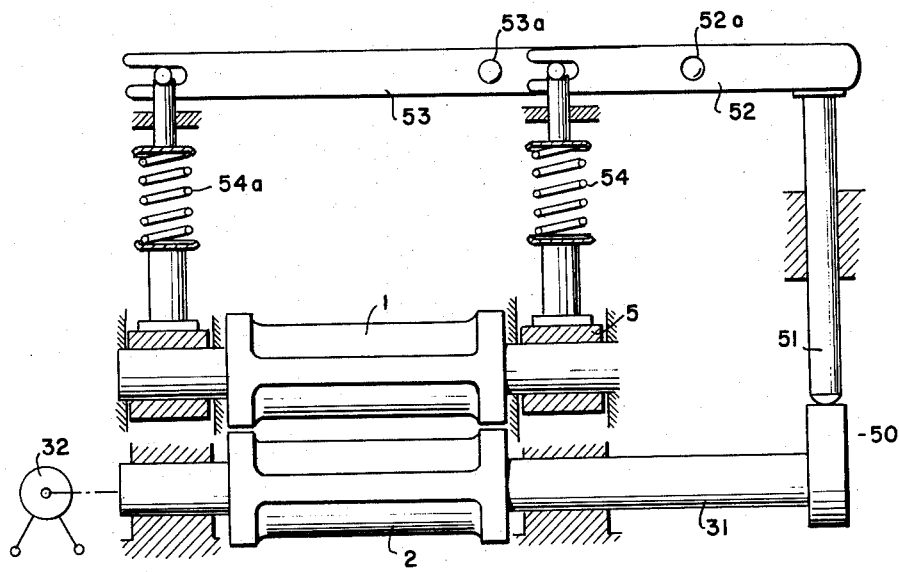
FIGS. 9 and 10 illustrate respective machines with a mechanically operating program controller.
Figure 10:
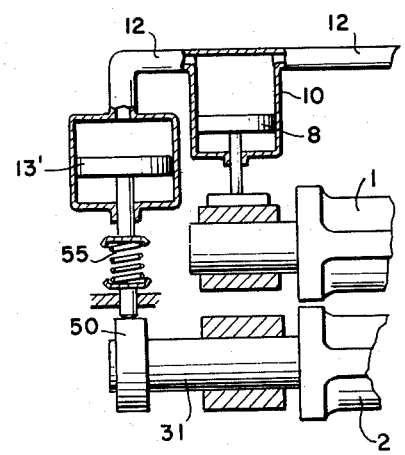
Figure 11:
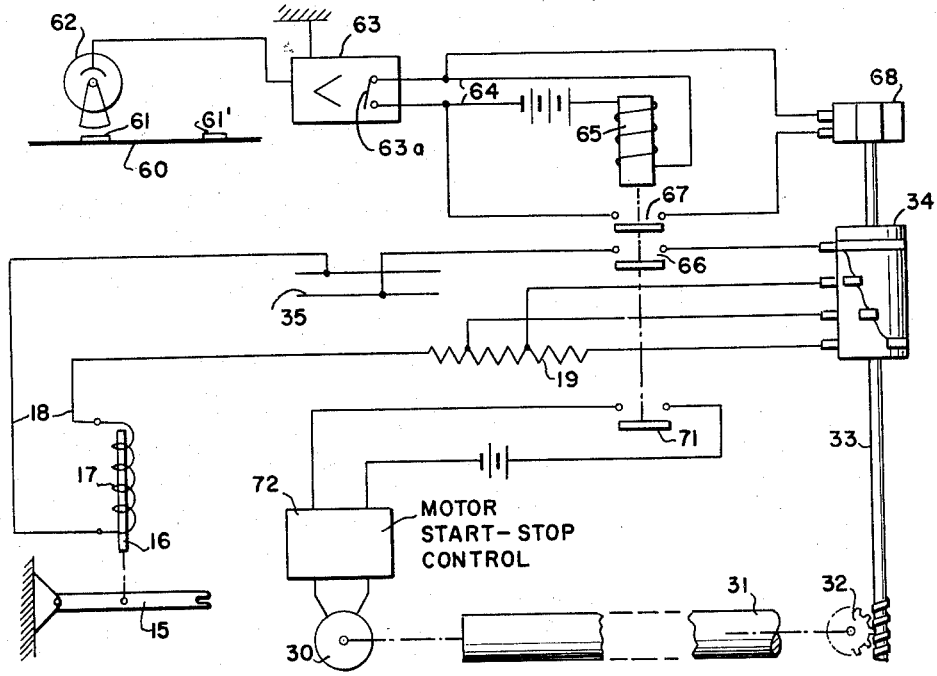
FIG. 11 is a modified electrical system applicable in conjunction with a machine otherwise according to FIGS. 1, 3 or 6.
Figure 12:
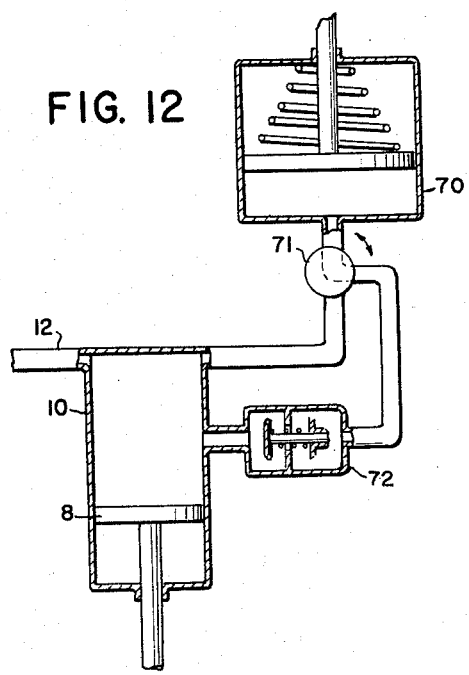
FIG. 12 shows a pressure accumulator preferably used as a component of the hydraulic pressure system in machines according to the invention.

The modifications illustrated in FIG. 9 and 10 comprise purely mechanical embodiments of the programming control system. A cam of suitably shaped contour is mounted on the shaft 31 of roller 2 and acts through a tappet 51 upon a lever 52 which is pivoted at 52a and transmits its controlled motion upon the upper abutment of a pressure spring 54 acting upon one bearing 5 of the upper roller 1. The same or a second tappet 51 acts upon another force transmitting lever 53 pivoted at 53a which controls the positioning of the upper abutment of a second pressure spring 54a acting upon the other bearing of the upper roller 1.

FIG. 10 shows a portion of a sealing machine of similar type in which a cam 50 on shaft 31 of roller 2 acts through a spring 55 upon the piston 13 of a hydraulic pressure system corresponding in all other respects to the one described with reference to FIG. 1. In this case the cam configuration of cam 50 constitutes the control program which is transmitted to the bearings of the upper nipping roller 1 by hydraulic means in dependence upon the cycle of sealing operation performed by the machine.

As mentioned above, the control performance of a machine according to the invention may be modified by signals extraneous to the sealing operation proper and supplied, for example, from the photoelectric register regulator. This is exemplified by the embodiment illustrated in FIG. 9 which shows only the electric portion of a machine otherwise corresponding to FIG. 1.

Denoted by 60 is the sheet or web of heat-sealable plastic packaging material passing through the machine and enveloping the material to be packaged before the folded web passes between the nipping rollers and is sealed into individual packages. As schematically shown, the web 60 carries a number of equally spaced registering marks 61, 61' such as dots of distinctive coloring which, during travel of the web, control the operation of a photoelectric cell 62, which, acting through an amplifier 63, operates a switch 63a. The switch controls an electric circuit 64 which actuates a relay 65. The circuit 64 is closed and the relay 65 will pick up as soon as a mark 61 appears beneath the photoelectric cell 62. Thereafter, the relay 65 holds itself energized through a self-holding contact 67 whose circuit extends through a normally closed, rotating contactor mounted on the shaft 33 of the programming drum contactor 34. Simultaneously, a main contact 66 of relay 65 closes the energizing circuit of the solenoid 17, so that the solenoid is energized by current under control by the drum contactor 34, as described above with reference to FIG. 1. This operation remains effective until the contact device 68, acting as an interrupter, opens the self-holding circuit of relay 65 so that this relay will drop out and will thereafter pick up only when the next register mark 61' causes the photocell 62 to release another cycle of operation. The relay 65 is shown to have another contact 71 which releases the operation of a start-stop control unit 72 for the drive motor 30 of the sealing roller 31. When contactor 68 causes the relay 65 to drop off, the motor 30 is stopped, and the drum 34 is arrested in its starting position and now ready to commence another cycle of control upon receipt of the next signal by relay 65.

The register mark 61 acting upon the photoelectric system may also be utilized to render the pressure between the web of packaging materials 60 and the nipping rollers so small that the web is not further forwarded between the rollers up to the moment when the nipping pressure between the rollers is again increased by the program control effected by the drum contactor 34 in dependence upon and synchronism with the machine operation.

When providing the package sealing machine with a hydraulic pressure system according to the invention, it may be desirable to make the nipping rollers exchangeable for rollers of different diameter. In this case, it is preferable to keep the hydraulic system filled with medium and under some continuous internal pressure to avoid the formation of air inclusions that may result in functional trouble. For this purpose, a hydraulic pressure accumulator 70, shown in FIG. 10, is preferably connected with the hydraulic system. In the illustrated embodiment, the accumulator 70 communicates through a two-way valve 71 selectively with the line 12 of the hydraulic pressure system or with a pressure switch 72. The pressure switch 72 is connected to the pressure space of the cylinder 10 and blocks the current flow from cylinder 10 to valve 71 when the pressure in cylinder 10 reaches a certain magnitude. This has the effect of maintaining some degree of equilibrium in the hydraulic system when the system is in idle condition, which makes it possible to maintain the pressure generating pistons of the system in any selected position. However, as soon as the return-flow valve 71 is closed and the solenoid 17 (FIG. 1) causes an increase in hydraulic pressure, a corresponding pressure is built up in cylinder 10 so that the pressure switch 72 will automatically close.

I claim:

1. In a package sealing machine having a pair of nipping rollers for pressure sealing of flat bags having sealing areas comprising at least one longitudinal and one transverse sealing edge and passing between said rollers, said machine being equipped with respective bearing means in journalling engagement with said two rollers, and drive means for driving at least one of said rollers, means for automatically adapting the nipping pressure of said rollers to the periodically variable size of the sealing areas of said bag, comprising the combination of control apparatus having pressure means connected with said bearing means of one of said rollers for varying the nipping pressure between said rollers, and a cyclical programming device connected to said drive to operate periodically in a given relation to the machine operation, said device being connected with said pressure means for controlling the latter to periodically vary said nipping pressure in accordance with a predetermined program.

2. In a package sealing machine having a pair of nipping rollers for pressure sealing of flat bags having sealing areas comprising at least one longitudinal and one transverse sealing edge and passing between said rollers, said machine being equipped with respective bearing means in journalling engagement with said two rollers, and drive means for driving at least one of said rollers, means for automatically adapting the nipping pressure of said rollers to the periodically variable size of the sealing areas of said bag, comprising the combination of control apparatus having pressure means connected with said bearing means of one of said rollers and having an electric control member for causing said pressure means to vary the nipping pressure between said rollers, and an electric programming device connected to said drive to operate periodically in a given relation to the machine operation, said device being electrically connected with said control member for controlling the latter to periodically vary said nipping pressure in accordance with a predetermined program.

3. In a package sealing machine having a pair of nipping rollers for pressure sealing of flat bags having sealing areas comprising at least one longitudinal and one transverse sealing edge and passing between said rollers, said machine being equipped with respective bearing means in journalling engagement with said two rollers, and drive means for driving at least one of said rollers, means for automatically adapting the nipping pressure of said rollers to the periodically variable size of the sealing areas of said bag, comprising the combination of control apparatus having a hydraulic system having pressure cylinder-and-piston means mechanically connected with said bearing means of one of said rollers and having a hydraulic-pressure control member for causing said system to vary the nipping pressure between said rollers, and a programming device connected to said drive to operate periodically in a given relation to the machine operation, said device being connected to said control member for controlling the latter to periodically vary said nipping pressure in accordance with a predetermined program.

4. In a package sealing machine having a pair of nipping rollers for pressure sealing of flat bags having sealing areas comprising at least one longitudinal and one transverse sealing edge and passing between said rollers, said machine being equipped with respective bearing means in journalling engagement with said two rollers, and drive means for driving at least one of said rollers, means for automatically adapting the nipping pressure of said rollers to the periodically variable size of the sealing areas of said bag, comprising the combination of control apparatus having a hydraulic system having pressure cylinder-and-piston means mechanically connected with said bearing means of one of said rollers and having a hydraulic-pressure control member for causing said system to vary the nipping pressure between said rollers, said control member having an electromagnetic actuator circuit, and an electric programming device connected to said drive to operate periodically in a given relation to the machine operation, said device being electrically connected with said actuator for energizing the latter in accordance with a predetermined pressure control program.

5. A sealing machine according to claim 4, comprising an electric circuit having a variable electric resistance means connected with said programming device for varying the current of said actuator in accordance with said program.

6. In a package sealing machine according to claim 3, said bearing means of said one roller comprising two bearings located at axially opposite sides of said roller, and said hydraulic system having piston areas of respectively different sizes actively connected with said two bearings so as to impose respectively different pressures thereupon.

7. In a package sealing machine according to claim 2, said control apparatus comprising condition-responsive sensing means independent of said programming device, and control means connecting said sensing means with said control member for additional control thereof.

8. A package sealing machine according to claim 3, comprising spring means connected with said bearing means for imposing thereupon a normally constant component of nipping pressure, whereby the total pressure between said roller is the resultant of said constant component and a variable component caused by said hydraulic system under control by said programming device.

References Cited in the file of this patent

UNITED STATES PATENTS

| | | |
|---|---|---|
| 2,374,504 | Salfisberg | Apr. 24, 1945 |
| 2,655,823 | Cozzo | Oct. 20, 1953 |
| 2,818,904 | Ambrose | Jan. 7, 1958 |
| 2,931,294 | Ritzerfeld | Apr. 5, 1960 |